United States Patent Office 3,230,203
Patented Jan. 18, 1966

3,230,203
PROCESS FOR THE MANUFACTURE OF COPOLYMERS OF VINYL CHLORIDE
Gerhard Kühne, Burghausen, Upper Bavaria, Germany, assignor to Farbwerke Hoechst Aktiengesellschaft vormals Meister Lucius & Brüning, Frankfurt am Main, Germany, a corporation of Germany
No Drawing. Filed Mar. 30, 1961, Ser. No. 99,377
Claims priority, application Germany Mar. 30, 1960
18 Claims. (Cl. 260—78.5)

The present invention relates to a process for the manufacture of copolymers of vinyl chloride.

It is known that copolymers of vinyl chloride can be prepared with other vinyl and vinylidene monomers containing the general grouping $CH_2=C<$, such, for example, as esters of vinyl alcohol, e.g. vinyl acetate or vinyl laurate or vinylidene chloride, or with copolymerizable maleic acid esters. The copolymers so obtained are easier to make into shaped articles than pure polyvinyl chloride but on the other hand they yield very brittle structures at room temperature which in part undergo further embrittlement on being stored. This strong embrittlement is so serious that it cannot be balanced by other favorable properties, such as good deep drawing properties and transparency. Moreover, the above copolymers have an undesired low softening point.

I have now found that copolymers of vinyl chloride with other unsaturated monomers or maleic acid esters containing the group $CH_2=C<$ can be prepared in the presence of catalysts yielding free radicals by using, in addition to the usual copolymerization components, which belong to the series of the above type of compounds, one or more monomers that polymerize with the formation of branched and/or cross-linked structures (briefly called hereinafter branching and/or cross-linking monomers), a part of these unsaturated branching and/or cross-linking monomeric starting materials being advantageously added in portions to the reaction mixture when at least about 50% of the total reaction mixture has undergone conversion, and completing the polymerization at a raised temperature.

As monomers which contain the group $CH_2=C<$ and are miscible with vinyl chloride there may be mentioned, for example, all the vinyl esters, such as vinyl acetate, vinyl propionate, vinyl butyrate, vinyl laurate, vinyl stearate as well as vinylidene compounds, such as vinylidene chloride and all the maleic acid esters and mixed esters wherein the alcohol component may contain 1–25 carbon atoms, such as maleic acid dibutyl ester, maleic acid dicetyl ester, maleic acid di-(2-ethylhexylester), or maleic acid butyl-hexyl ester. These monomers are preferably used in a proportion of up to 35% by weight, calculated on the total weight of the monomers. Chloromaleic acid esters of the same alcohols may also be used.

As cross-linking and/or branching unsaturated compounds which are used in the process of this invention there may be mentioned more especially: esters of allyl and methallyl alcohol, such as allyl acetate, allyl laurate and allyl benzoate; diallyl esters of dibasic acids, for example, adipic acid, sebacic acid or phthalic acid; mixed allyl-alkyl esters of phthalic acid, phosphoric acid allyl ester, cyanuric acid allyl esters and the mixed esters of these acids with saturated alcohols; diallyl esters of maleic acid, chloromaleic acid or fumaric acid or their mixed esters with saturated alcohols; esters of unsaturated acids with glycols, such as ethylene glycol-bis-acrylic acid esters or butylene glycol-1,3-biscrotonic acid esters and their derivatives; divinyl compounds, such as divinyl benzene, divinyl sulfide or divinyl pyridine, and also compounds which contain vinyl and allyl groups, such as vinylphosphonic acid diallyl esters, wherein the alcohol component of the esters may contain 1–25 carbon atoms.

In view of the fact that the reactivity of these compounds and their activity in the polymerization differs considerably depending on the number of polymerizable double bonds, they may be used in the total monomer mixture in a concentration which varies within wide limits. Cross-linking and/or branching monomers which exhibit a slight tendency to cross-linking may be used in the total monomer mixture in a proportion of up to 10%, while cross-linking and/or branching monomers which have a very pronounced tendency to cross-linking may be used in a proportion of as low as 0.05% to produce the desired effect. When mixtures of these two extreme representatives of monomers are used, it is advantageous in most fields of application to use such mixtures in a concentration of 1 to 3%, calculated on the total weight of the mixture of monomers.

In carrying out the process of this invention, it is advantageous to add a portion of the branching and/or cross-linking monomers to the polymerization mixture when about 50% of the latter has undergone conversion. Components having a stronger cross-linking and/or branching effect should advantageously be added at a degree of conversion higher than that 50% limit, while components producing a less strong cross-linking and/or branching effect are advantageously added at a degree of conversion lower than said 50% limit. Alternatively, a component producing slight cross-linking and/or branching effects may be added from the onset to the polymerization mixture and a compound producing a stronger cross-linking and/or branching effect may be added at a degree of conversion higher than that 50% limit.

The subsequent addition of the cross-linking and/or branching unsaturated compounds may take place in one or more stages. In most cases, these compounds are advantageously added in three stages but the number of stages is not in principle limited. In other words, the above compounds are added within the range before and after the commencing pressure drop of the vinyl chloride.

Before the pressure drop, the polymerization temperature is generally 30° to 60° C.

In order to carry out the process of this invention successfully, it is essential that after the addition of the cross-linking and/or branching monomers the polymerization of the reaction mixture is completed at a raised temperature which may be as high as 100° C. while in most cases temperatures of 70 to 80° C. are sufficient. It is advantageous not suddenly but gradually to produce such higher temperature and to maintain it for some time when the desired degree has been reached. In general, a heating period of 3 hours and a further 1 to 3 hours are required to complete the polymerization. In principle, the temperature should be raised when the pressure commences to drop in the reaction vessel or after that moment.

In carrying out the process of this invention, the monomers may be suspended by means of customary suspending agents, for example methylcellulose, polyvinyl alcohol or gelatin. There may also be used surface-active substances, such as soap, alkyl sulfonates or alkyl sulfates and polyglycols. A part of these auxiliary suspending agents may be added subsequently to the polymerization mixture together with the cross-linking and/or branching unsaturated compounds.

As catalysts which are suitable for use in the polymerization according to this invention there may be mentioned, for example, the customary free radical-liberating substances, such as peroxides and azonitriles, for example, lauroyl peroxide, benzoyl peroxide, diisopropyl percarbonate, hydrogen peroxide, potassium persulfate and azo-isobutyric acid dinitrile. In some cases it may be advantageous to add together with the cross-linking and/or branching unsaturated compound a peroxide which decomposes at a temperature higher than lauroyl peroxide, for example, cyclohexanone peroxide.

The instant invention can be carried out with many modifications as regards the type and nature of the suspending agents and catalysts used. In a special variant of the above process, it has proved, however, particularly advantageous to use as suspending agent protective colloids, such as high molecular, water-soluble compounds, for example, methylcellulose or polyvinyl alcohol, in association with monomer-soluble catalysts.

The ratio in which to use the monomeric and aqueous phases may be varied within wide limits. It is generally advantageous, however, to use a ratio not higher than 1:2 in order not to impair the readiness of the resulting polymer grain to undergo uniform gelatinization.

The copolymers obtained by the process of this invention exhibit a high elongation at break and at the same time a good rigidity and a relatively high softening point. They are, therefore, distinctly superior to other internally plasticized copolymers of vinyl chloride.

Among the copolymers which can be obtained by the process embodying the invention the following are specifically referred to but without unnecessarily limiting the scope of the invention.

A copolymer consisting of 60 to 90% vinyl chloride and 5 to 35% vinyl laurate, and also containing 0.5 to 5% by weight of incorporated allyl acetate, calculated on the total weight of the monomers.

A copolymer consisting of 60 to 90% vinyl chloride and 5 to 35% maleic acid dicetyl ester, and also containing 1 to 5% by weight of incorporated phthalic acid lauryl-allyl ester, calculated on the total weight of the monomers.

A copolymer consisting of 60 to 90% vinyl chloride and 5 to 35% vinyl stearate, and also containing 1 to 5% by weight of incorporated phthalic acid diallylester, calculated on the total weight of the monomers.

A copolymer consisting of 60 to 90% vinyl chloride and 5 to 35% vinyle laurate, and also containing 0.5 to 4% by weight of incorporated allyl laurate and 0.1 to 1% by weight of incorporated ethylene-glycol-bisacrylic acid ester, calculated on the total weight of the monomers.

A copolymer consisting of 60 to 90% vinyl chloride and 5 to 35% chloromaleic acid dilaurylester, and also containing 0.5 to 5% of incorporated phosphoric acid dilauryl-allyl ester, calculated on the total weight of the monomers.

The following examples serve to illustrate the invention but they are not intended to limit it thereto:

EXAMPLE 1

A batch consisting of 85.5 kg. vinyl chloride, 12 kg. vinyl laurate, 200 kg. water, 200 g. lauroyl peroxide and 350 g. methyl-cellulose was admixed in a stirring vessel with 2 kg. allyl acetate, and the polymerization was carried out at 53° C. until a pressure of 6.8 atmospheres was reached. 50 grams methylcellulose in 2 liters water and subsequently 0.5 kg. allyl acetate were added and the polymerization was continued until the pressure dropped to 5.3 atmospheres. The whole was heated within 3 hours to 70° C. and maintained at that temperature for one hour. After a total reaction time of 17 hours, the final pressure was 3.0 atmospheres. The resulting copolymer which was obtained in the form of a fine powder could be processed by the customary methods.

A film (I) 0.25 mm. thick obtained by calendering the copolymer so produced at a raised temperature exhibited the valuable properties indicated in the following table and was distinctly superior to a corresponding film (II) prepared from a copolymer of vinyl chloride and 13% vinyl laurate.

| Film material | Thickness of film, mm. | Elongation at break, percent | Height of falling ball at 20° C., cm.[1] | Rigidity at 60° C., g./cm.[2] | Softening point in ° C.[3] |
|---|---|---|---|---|---|
| (I) according to Example 1 | 0.25 | 150 | 130 | 120 | 70 |
| (II) comparative film | 0.25 | 10–12 | 20 | 45 | 55 |

[1] A ball of 1900 grams was allowed to fall on the film clamped in a ring. The values in the table indicate the height of fall at which the film did not crush or split.
[2] Measured in a Frank type rigidity testing device.
[3] Measured on cans 75 mm. wide, deep drawn 1:3 and annealed for 1 hour in a heating cabinet. The temperature at which deformation did not yet occur indicates the value of thermal stability under load or the softening point, respectively.

The film produced from the copolymer obtained by the process of this invention is tough and elastic and possesses a high elongation at break, a high ball pressure indentation hardness and rigidity and a softening point which approaches that of pure polyvinyl chloride. The comparative film (II) is brittle and has a substantially lower softening point.

EXAMPLE 2

An autoclave provided with a stirrer was charged with 85.0 kg. vinyl chloride, 11 kg. maleic acid dicetylester, 3 kg. phthalic acid lauryl-allyl ester, 200 grams lauroyl peroxide and 200 kg. water containing 500 grams dissolved polyvinyl alcohol and 50 grams $C_{12}$-alkyl sulfonate. The whole was heated to 56° C. and maintained at that temperature. When the pressure had dropped to 6.2 atmospheres, 0.5 kg. phthalic acid lauryl-allyl ester and 50 grams cyclohexanone peroxide were added, and a further 0.5 kg. phthalic acid lauryl-allyl ester was added when the pressure was at 5.5 atmospheres. The polymerization was continued until the pressure amounted to 5.0 atmospheres, the whole was heated within 2 hours to 75° C. and maintained at that temperature for 2 hours.

The total reaction time amounted to 13 hours and the final pressure to 2.5 atmospheres. The dried product isolated from the reaction sludge had a very fine-grained structure and could readily be made into flexible films on the roller. The films so produced had properties similar to those of the film described in Example 1. Their softening point was at 72° C.

EXAMPLE 3

In a reaction vessel, 85 kg. vinyl chloride together with 14.9 kg. vinyl stearate and 10 grams phthalic acid diallyl ester were suspended in 200 kg. water, while adding the customary suspending agents and activator, and the reaction mixture was polymerized at 55° C. until the pressure dropped to 6.0 atmospheres. A further 90 grams phthalic acid diallylester were forced into the reaction mixture, the polymerization was continued until the pressure was 5.5 atmospheres, the whole was heated within 3 hours to 70° C. and maintained at that temperature for 2 hours. After 15 hours of reaction, the whole was discharged and a fine-grained polymer was isolated which was only little brittle.

EXAMPLE 4

A mixture of 85 kg. vinyl chloride, 12.7 kg. vinyl laurate, 200 kg. water, 300 grams methylcellulose, 200 grams lauroyl peroxide and 2 kg. allyl laurate was heated to 53° C. and polymerized until the pressure was at 6.5 atmospheres. 300 grams ethylene glycol bisacrylic acid ester were forced into the reaction mixture, the polymerization was continued until the pressure was at 5.0 atmospheres, the whole was heated within 2 hours to 78° C. and maintained at that temperature for one hour. After a total reaction period of 16 hours, a white, fine polymer was obtained which could be pressed into extremely flexible sheets.

EXAMPLE 5

A mixture of 82 kg. vinyl chloride, 13 kg. chloromaleic acid dilauryl ester and 3 kg. phosphoric acid dilauryl-allyl ester were suspended in 200 kg. water while adding 600 grams gelatin and 200 grams azodiisobutyronitrile. The whole was heated to 50° C. and polymerized until the pressure was 4.8 atmospheres. A further 2 kg. phosphoric acid dilauryl-allyl ester together with 100 grams of cyclohexanone peroxide were added, the polymerization was continued until the pressure was at 4.0 atmospheres, the whole was heated within 4 hours to 80° C. and maintained at that temperature for 3 hours. After 24 hours of reaction, a fine-grained polymer was obtained which could be rolled in its dried state into a flexible transparent film having a still favorable softening point of 60° C.

I claim:

1. In a process wherein 60–90% by weight of vinyl chloride is copolymerized in the presence of a free radical-liberating catalyst with (a) 5–35% by weight of a weak cross-linking monomer selected from the group consisting of a vinyl ester of a monobasic aliphatic acid, vinylidene chloride, and maleic acid esters, the alcohol component of which is a saturated alcohol containing 1–25 carbon atoms, and (b) 0.5–5% by weight of a monomer of greater cross-linking tendency which is selected from the group consisting of esters of allyl alcohol and methallyl alcohol with aliphatic and aromatic monobasic and dibasic acids, mixed allyl-alkyl esters of phthalic acid, phosphoric acid allyl esters, cyanuric acid allyl esters, mixed esters of dibasic acids with saturated and unsaturated alcohols, an ester of an unsaturated acid with a glycol, a divinyl compound, and a vinyl phosphonic acid diallyl ester, the total weight of monomers equaling 100%, the improvement comprising conducting the polymerization in two steps, in the first step of which vinyl chloride is polymerized with at least one monomer (a) and a portion of at least one of the monomers (b) in aqueous suspension and in the presence of a suspending agent, until at least about 50% of the total reaction mixture has undergone conversion, and thereafter in a second step adding a further amount of said monomer (b) and completing the polymerization at an elevated temperature of 70°–100° C., the proportion of monomer (b) added in the first step of polymerization being from 10–85% by weight, with the remaining 90–15% being added in the second step.

2. The process of claim 1 wherein monomer component (a) is employed in an amount of up to 10% by weight based on the total weight of monomers.

3. The process of claim 1 wherein monomer component (b) is added to the polymerization system together with a peroxide which has a decomposition temperature higher than that of lauryl peroxide.

4. The process of claim 1 wherein the polymerization is conducted in the presence of a protective colloid as the suspending agent and in the presence of a monomer-soluble catalyst.

5. The process of claim 1 wherein vinyl chloride is copolymerized with vinyl laurate and allyl acetate in such proportions as to produce a copolymer consisting of 60–90% vinyl chloride, 5–35% of vinyl laurate and 0.5–5% by weight of allyl acetate, the total weight of monomers equaling 100%.

6. The process of claim 1 wherein vinyl chloride is copolymerized with dicetyl maleate and phthalic acid lauryl-allyl phthalate in such proportions as to produce a copolymer consisting of 60–90% vinyl chloride, 5–35% diacetyl maleate, and 1–5% of phthalic acid lauryl-allyl phthalate based on the total weight of monomers, the total weight of monomers equaling 100%.

7. The process of claim 1 wherein vinyl chloride is copolymerized with vinyl stearate and diallyl phthalate in such proportions as to produce a copolymer consisting of 60–90% vinyl chloride, 5–35% of vinyl stearate and 1–5% of diallyl phthalate based on the total weight of monomers, the total weight of monomers equaling 100%.

8. The process of claim 1 wherein vinyl chloride is copolymerized with vinyl laurate, allyl laurate, and ethylene glycol bisacrylic acid ester in such proportions as to produce a copolymer consisting of 60–90% vinyl chloride, 5–35% of vinyl laurate and 0.5–4% by weight of incorporated allyl laurate and 0.1–1% of incorporated ethylene glycol bisacrylic acid ester calculated on the total weight of the monomers, the total weight of monomers equaling 100%.

9. The process of claim 1 wherein vinyl chloride is copolymerized with a dilauryl ester of chloromaleic acid and phosphoric acid dilauryl-allyl ester in such proportions as to produce a copolymer consisting of 60–90% vinyl chloride, 5–35% of the dilauryl ester of chloromaleic acid and 0.5–5% by weight of incorporated phosphoric acid dilauryl-allyl ester, calculated on the total weight of the monomers, the total weight of monomers equaling 100%.

10. The product produced by the process of claim 1.
11. The product produced by the process of claim 2.
12. The product produced by the process of claim 3.
13. The product produced by the process of claim 4.
14. The product produced by the process of claim 5.
15. The product produced by the process of claim 6.
16. The product produced by the process of claim 7.
17. The product produced by the process of claim 8.
18. The product produced by the process of claim 9.

References Cited by the Examiner

UNITED STATES PATENTS

| | | | |
|---|---|---|---|
| 2,202,846 | 6/1940 | Garvey et al. | 260—78.5 |
| 2,777,836 | 1/1957 | Everard et al. | 260—78.5 |

FOREIGN PATENTS

| | | |
|---|---|---|
| 163,209 | 6/1955 | Australia. |
| 492,279 | 3/1951 | Canada. |

JOSEPH L. SCHOFER, *Primary Examiner.*

M. LIEBMAN, *Examiner.*